INVENTOR.
WILLIAM FRANTZ
BY Julian C. Renfro
ATTOR.

3,133,553
HYDROMECHANICAL REMOTE INDICATION
AND MEMORY APPARATUS
William Frantz, Winter Park, Fla., assignor to Martin-Marietta Corporation, Middle River, Md., a corporation of Maryland
Filed Mar. 26, 1962, Ser. No. 182,191
12 Claims. (Cl. 137—85)

This invention relates to memory systems and apparatus, and more particularly to improved hydromechanical memory apparatus.

The present invention is directed to an improved hydromechanical memory apparatus which overcomes a number of problems which have been present in hydraulic systems now in use, which systems are intended to perform control, computing, indicating, and related functions. These problems may be said to include sensitivity to temperature changes, inability to maintain constant or predetermined pressures with changing volume requirements of the system, inability to accurately perform quantitative or analog functions as opposed to "on-off" binary functions, and inability to provide a continuous pressure fluid output capable of performing work corresponding to a stored or remembered prior reference pressure. Such problems or shortcomings were notably associated with hydraulic systems of the closed or volumetric types which are generally characterized by means for storing specific quantities of fluid at specific pressures, or by means for providing a predetermined number of distinct operating conditions useful in binary or other digital systems.

As an example of the foregoing, assume that a reference signal, in the form of a hydraulic fluid under pressure corresponding to a condition to be remembered, is applied to a closed volumetric system so that a volume of fluid is stored which manifests a pressure corresponding to the reference signal pressure. While the stored pressure and/or volume has an instantaneous value corresponding to the reference pressure, the stored fluid pressure may not be used for doing work such as operating an indicator, pilot valve, or the like, without reducing the pressure or volume and thereby introducing an error which is proportional to the work done. While this error may be held to small initial values by operating indicators requiring little work, it will be recognized that the percentage of error increases with each subsequent increment of work, and consequently that such volumetric systems are of limited value in performing quantitative or analog functions. In this example, it will be seen also that temperature changes experienced by the system will be manifested by a direct change in the stored pressure volume condition.

Accordingly, it is one object of this invention to provide a hydromechanical memory system or apparatus which can be conditioned by application of a continued or momentary reference signal pressure to be remembered, and thereafter may be questioned to provide an answer in the form of fluid pressure corresponding to the reference signal, which fluid pressure answer may be utilized to perform usable work without measurably disturbing the memory condition of the apparatus.

It is another object of this invention to provide a memory apparatus or system of the foregoing character which is relatively insensitive to temperature changes and is capable of being conditioned to store any one of an infinite number of reference signals within its range of operation, so that the apparatus is capable of accurately performing quantitative and analog functions.

It is another object of this invention to provide a useful pressure signal, capable of doing work at a distance, proportional to a pressure or force existing at a given location in a manner which will not affect the original reading.

My invention achieves these and other objects through the use of a memory unit placed in a live, flowing system and which may be conditioned by application of a reference pressure to establish a corresponding pressure zone in the flowing system, the pressure fluid from said zone being usable to perform quantities of work without introducing any error or change in the pressure available to do subsequent work. More specifically the invention relies on the concept that fluid flowing sequentially through a pair of restrictive orifices connected in series between a supply and a drain having a fixed differential of pressure therebetween, will establish a pressure zone between the orifices in which zone the pressure will be a function of the sizes of the orifices and will be independent of the volume of fluid therebetween. The volume between the orifices, then, may be changed in doing an increment of work with the pressure after completion thereof equaling the pressure before the work was done.

The present invention provides means for automatically adjusting the size of one of the orifices so that the pressure therebetween may be varied to correspond to a reference pressure to be remembered. The dependency of the variable pressure $P_v$ between the orifices upon the size of the variable orifice may be shown by consideration of the following: wherein $P_s$=source pressure, $P_d$=drain pressure, $A_f$=fixed orifice area, $A_v$=variable orifice area, $C_d$=coefficient of discharge, and $\rho$=fluid density.

Recalling that the rate $q$ (volume per unit time) at which liquid of density $\rho$ will flow through an orifice of area A having a pressure drop $\Delta P$, as shown by Bernoulli to be represented as $$q = C_d A \sqrt{\frac{2g\Delta P}{\rho}}$$

with $g$ the gravitational constant, and that in the present instance the rate of flow must be the same through each of the series of orifices $A_f$ and $A_v$, then $$q = C_d A_f \sqrt{\frac{2g(P_s - P_v)}{\rho}} = C_d A_v \sqrt{\frac{2g(P_v - P_d)}{\rho}}$$

or $$A_f \sqrt{(P_s - P_v)} = A_v \sqrt{(P_v - P_d)}$$

and $$\frac{(P_s - P_v)}{(P_v - P_d)} = \left(\frac{A_v}{A_f}\right)^2 \qquad \text{Equation I}$$

but, by virtue of the pressure regulating means, $$(P_s - P_d) = K$$

a constant. By making the drain pressure $P_d$ small or negligible compared to the other pressures, and the discharge coefficients of $A_f$ and $A_v$ equal by design, then $$\frac{K - P_v}{P_v} = \left(\frac{A_v}{A_f}\right)^2$$

and $$\frac{K}{P_v} - 1 = \left(\frac{A_v}{A_f}\right)^2 \text{ or } \frac{K}{P_v} = \left(\frac{A_v}{A_f}\right)^2 + 1$$

and $$P_v = \frac{K}{\left(\frac{A_v}{A_f}\right)^2 + 1} \qquad \text{Equation II}$$

Thus, $P_v$, the pressure between the orifices, is dependent upon the ratio of the sizes of the orifices, and the volume of liquid therebetween may be changed, momentarily, as by doing an increment of work, without changing $P_v$. Moreover, fluid density variation with temperature is eliminated as a factor affecting $P_v$.

The invention makes use of the foregoing relationships to measure, indicate or remember external reference pressures $P_r$ by providing structure for establishing a definite ratio between the area of a fixed orifice and the area of a variable orifice for each value of reference pressure to be measured, the orifices being arranged in series with a first chamber therebetween so that continuous fluid flow through the orifices will establish a pressure $P_v$ in the chamber which varies with changes in the ratio of orifice areas and hence with changes in the reference pressure. The reference pressure is manifested in a second chamber adjacent the first chamber and acts on a movable means, the movements of which change the area of the variable orifice, and the ratio between the orifice areas until there is established a pressure $P_v$ in the fluid flowing through the first chamber which acts against the movable means to equal or balance the reference pressure in the first chamber. Inasmuch as the balancing pressure $P_v$ in the first chamber then corresponds to or equals the external reference pressure, the pressure $P_v$ in the first chamber may be read by suitable indicating means as a measure of the existing external reference pressure. Also, since the first chamber, in which $P_v$ is established, is part of a live, flowing system, pressure fluid from the first chamber may be utilized to perform useful work without notably changing either $P_v$ or $P_r$.

The means by which the variable orifice size is changed preferably comprises a tapered needle valve means positionable by pressure responsive means such as a piston or bellows which is acted upon in one direction by the reference pressure $P_r$ to be remembered, and in the opposite direction by the variable pressure between the orifices. Differences in the pressure effects on opposite sides of the pressure responsive means will be manifested by movement of the needle valve to change the variable orifice so as to provide a balance of the opposing pressure effects on the pressure responsive means.

The balancing function will be readily understood upon consideration of the following conditions assumed to exist in an apparatus wherein the needle valve positioning pressure responsive means has an area $A_1$ acted upon in one direction by reference pressure $P_r$ and an area $A_2$ acted upon in the opposite direction by variable pressure $P_v$. A balanced condition existing on the pressure responsive means may be expressed as $P_r(A_1) = P_v(A_2 - A_v)$, where $A_v$, as before, represents the variable orifice area. Then, $$P_v = P_r \frac{A_1}{(A_2 - A_v)}$$

Assuming $A_1$ and $(A_2 - A_v)$ to be substantially equal, it will be evident that $P_v$ will substantially equal $P_r$. It will also be evident that as $A_v$ decreases, as a result of movement of the needle valve upon an increase in $P_r$, $P_v$ will experience a corresponding increase. This then shows that $P_v$ will, in actuality, seek a pressure corresponding to $P_r$ as a result of operation of the needle valve.

By providing the memory apparatus of this invention with a mode selecting means for hydraulically locking the pressure responsive means and needle valve in the position wherein $P_v$ corresponds to $P_r$, the pressure $P_v$ will thereafter remain constant regardless of further changes in $P_r$. Moreover, as explained heretofore, $P_v$ may be utilized to perform useful work without disturbing the setting of the needle valve and, at the completion of the work, $P_v$ will always be restored to the pressure corresponding to the reference pressure. Also, because memory systems embodying this invention are supplied with flowing hydraulic fluid, the temperature of which may be conveniently regulated, relatively constant and reproducible results may be achieved regardless of ambient temperature variations, though this fluid temperature regulation is not required for correct operation of the device disclosed herein.

The invention may further be said to reside in certain constructions and arrangements of parts by which the foregoing objects and advantages, as well as others, are achieved as will be readily understood from the following detailed description of presently preferred embodiments of the invention read in conjunction with the accompanying sheets of drawings, forming a part of this specification, and in which.

Figure 1:
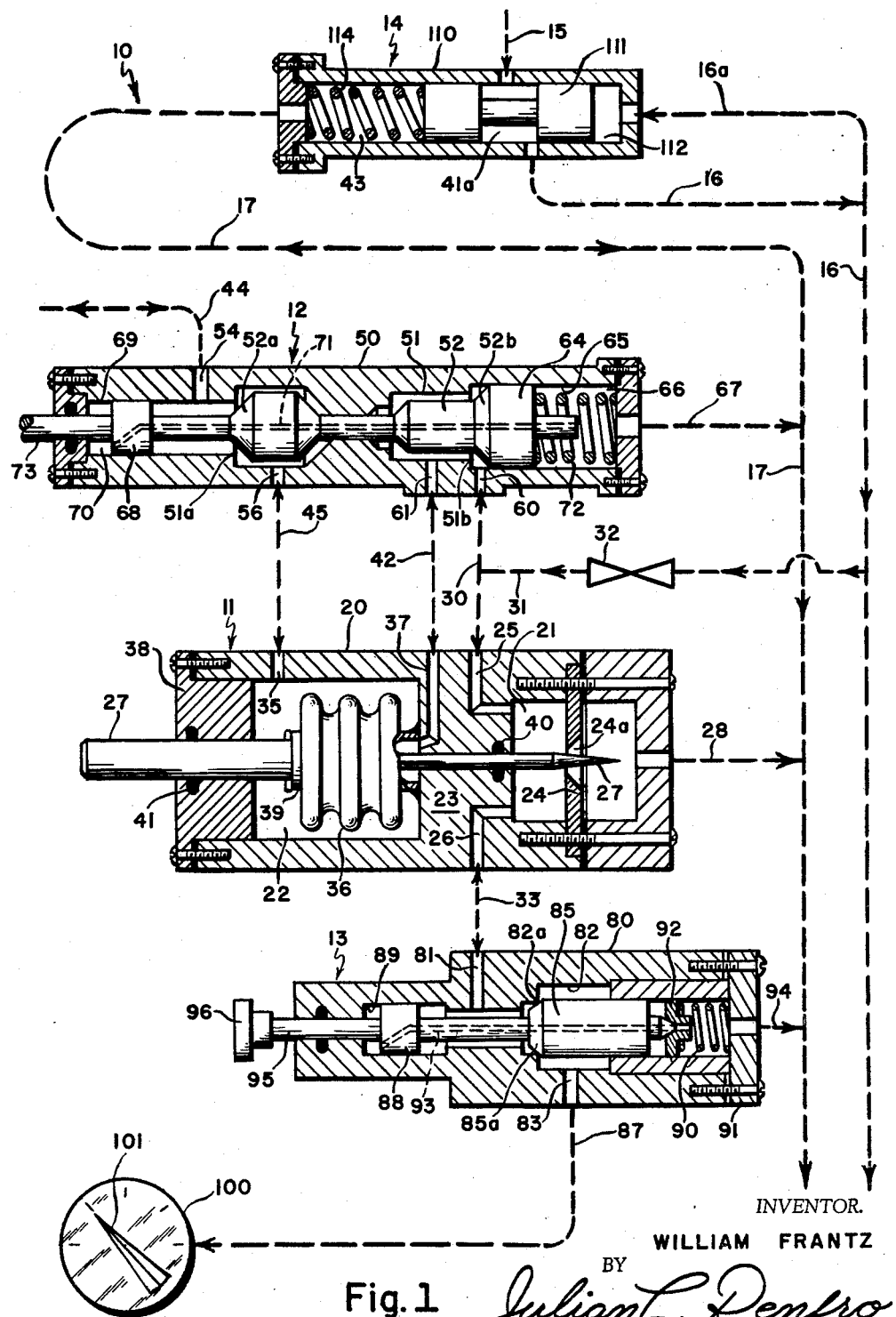
FIG. 1 is a schematic illustration of memory apparatus embodying this invention.

In the form of the invention shown in FIG. 1, there is provided a hydromechanical memory apparatus 10 comprising a memory unit 11, a mode selector 12, and a questioner 13. A differential pressure regulator 14 is connected by a supply line 15 to a source of hydraulic pressure fluid, and serves to maintain a constant pressure differential between a memory apparatus regulated supply line 16 and an apparatus drain line 17.

Memory unit 11 comprises a body 20 in which are defined chambers 21 and 22 separated by a dividing wall 23. Chamber 21, which is defined in part by a variable orifice plate 24, is served by inlet and outlet passages 25 and 26 respectively, defined in body 20. Orifice plate 24 is provided with a variable orifice 24a, the effective area of which is governed by a tapered needle 27. Orifice 24a leads from chamber 21 to drain line 17 via line 28. Passage 25 is connected by suitable tubing or lines 30 and 31 to regulated supply line 16 through a fixed orifice 32. Passage 26 is connected by a suitable connecting line 33 to questioner 13 which is, in effect, a normally closed valve and will be more fully described as the description proceeds.

Chamber 22 is served by an inlet passage 35 and contains a pressure responsive means in the form of an expansible bellows 36 which is secured to wall 23 and the interior of which communicates with a passage 37 in body 20. Needle 27 extends through dividing wall 23, bellows 36, and end wall 38 of housing 20, and is secured as at 39 to the movable end of bellows 36. Needle 27, which is surrounded by O-rings or other suitable packing 40 and 41 preferably of low friction, is adapted to be reciprocated upon expansion and contraction of bellows 36 to change the cross-sectional area of variable orifice 24a.

The fixed orifice 32 and the variable orifice 24a are arranged in series with chamber 21 therebetween, so that a continuous flow of fluid may be traced from regulated supply line 16 through fixed orifice 32, lines 31 and 30, passage 25, chamber 21, variable orifice 24a, and line 28 to drain line 17. This continuous flow, under the influence of a fixed or constant pressure differential $\Delta P$ maintained between lines 16 and 17, results in a pressure $P_v$ being established in chamber 21 between the orifices and, as pointed out earlier in Equation I, pressure $P_v$ depends upon the ratio between the areas of the fixed and variable orifices. Pressure $P_v$ in chamber 21 therefore depends directly upon the position of tapered needle 27 which determines the effective area of variable orifice 24a, and is independent of variations in fluid density resulting from temperature changes.

Needle 27 is positioned with respect to orifice plate 24 by balancing the effect of fluid pressure $P_v$, when applied to the interior of bellows 36, against the effect of a reference pressure to be measured or remembered and applied to the exterior of bellows 36 in chamber 21. Pressure $P_v$ is applied to the interior of bellows 36 under the control of mode selector 12, described more fully hereinafter, via passage 25, line 30, selector 12, a line 42, and passage 37. A reference pressure $P_r$, to be remembered or measured and existing in an external line 44 connected to selector 12, is applied to the exterior of bellows 36 in chamber 22 through a line 45 connected between selector 12 and passage 35.

Pressure $P_v$ acts to move needle 27 to the left, as viewed in the drawings, thereby tending to increase the area of orifice 24a and to reduce pressure $P_v$ in chamber 21, while pressure $P_r$ tends to move the needle to the right and hence to reduce orifice 24a and increase $P_v$. Accordingly, needle 27 will be moved to assume a position in which the pressure effect of $P_v$ in bellows 36 just balances the pressure effect of $P_r$ thereon. When this condition obtains, the pressure $P_v$ in chamber 21 may be read, in a manner which will become apparent as the description proceeds, as being equal to or corresponding to the pressure $P_r$ in external line 44. Moreover, the mode selector 12 may be operated to hydraulically lock the needle 27 against further movement regardless of subsequent changes in the pressure in line 44. The pressure $P_v$ in chamber 21 will therefore be unaffected by such subsequent changes in pressure in line 44, and hence may be said to remember the pressure which existed in that line at the time of locking by mode selector 12.

Mode selector 12 which controls the flow of pressure fluid into and out of chambers 21, 22 and bellows 36, comprises a body 50 having a stepped central bore 51 containing a spool type reciprocable valve member or spool 52 which cooperates with various valve seat surfaces provided in bore 51 to accomplish the storing and locking functions. Thus, body 50 is provided with a reference pressure inlet passage 54 connected to the reference pressure line 44 and communicating through bore 51 with a passage 56 which is connected by tube or line 45 to passage 35 leading to chamber 22 of memory unit 11. Flow of reference pressure fluid between line 44 and chamber 22 may be interrupted by movement of spool 52 to bring a valve surface 52a thereof against a valve seat surface 51a of bore 51.

Mode selector 12 has a pair of passages 60 and 61 connected by tube means 30 and 42 to passages 25 and 37 respectively of memory unit 11. Chamber 21 and the interior of bellows 36 are thereby placed in communication with one another through bore 51 and the flow of pressure fluid therebetween may be interrupted by movement of valve member 52 to the left so as to bring valve surface 52b thereof into engagement with valve seat surface 51b of bore 51.

Valve spool 52 has a piston-like end 64 acting in a cylinder portion 65 of bore 51 so as to define a chamber 66 communicating with drain line 17 through a line 67. The other end of spool 52 has a piston-like end 68 operating in a cylindrical bore portion 69 of bore 51 and defining a chamber 70. Chamber 70 is placed into communication with chamber 67 by an axial bleed passage 71 in the spool. Piston 68 serves to offset the tendency of pressure in passage 54 against spool surface 52a tending to move the spool to the right, while pressure in passages 60 and 61 act against piston 64 tending to offset the pressure of a spring 72. Spring 72 is, however, of sufficient strength to hold spool 52 with valve surfaces 52a and 52b in a normally closed position. Spool 52 may be moved to the right hand or open position illustrated in FIG. 1 by the application of force to an external extension 73 thereof by any suitable means such as manually, fluid pressure devices, and the like.

Assuming the apparatus to be filled with hydraulic fluid and a reference pressure $P_r$ to be present at reference line 44, and with the mode selector in the memory unit conditioning position shown in the drawings, the reference pressure will be transmitted to chamber 22 tending to compress bellows 36 and move needle 27 to restrict orifice 24a. At the same time a fluid pressure $P_v$ will be established in chamber 21 between fixed orifice 32 and variable orifice 24a, which pressure is dependent upon the pressure differential between lines 16 and 17 and upon the effective areas of orifice 32 and orifice 24a. The pressure $P_v$ in chamber 21 is transmitted via passage 25, tube 30, passages 60 and 61, line 42 and passage 32 to the interior of bellows 36. This transmittal of pressure from chamber 21 to the interior of bellows 36 tends to expand the latter and withdraw needle 27 from orifice 24a.

It will be recognized that the bellows will position needle 27 so that the effect on the bellows of pressure $P_r$ within chamber 22 will be balanced by the effect of the pressure $P_v$ within the bellows and within chamber 21. It will also be recognized that if the effective areas inside the bellows and outside the bellows are made equal, as by making the shaft of needle 27 in wall 38 of the same diameter as the inside of bellows neck 36a, the needle 27 will be positioned so that the pressure in chamber 21 will become equal to the pressure in chamber 22. If mode selector 12 is now operated to its locking position by allowing spring 72 to shift spool 51 to the left so as to close valve surfaces 52a and 52b against their respective seats, bellows 36 and needle 27 will be hydraulically locked against further movement regardless of pressure changes in reference line 44 or chamber 22.

Questioner 13, which is connected to chamber 21 by passage 26 and line 33, comprises a valve body 80 having an inlet passage 81, a stepped central bore 82, and an outlet passage 83. A valve member 85 is reciprocably disposed in bore 82 and has a valve surface 85a cooperating with a valve seat surface 82a to control the transmittal of fluid pressure $P_v$ from chamber 21 to an answer pressure line 87 connected to outlet passage 83. Valve member 85 has a pressure balancing piston portion 88 disposed in a cylindrical portion 89 of bore 82, and the valve member is normally urged towards its illustrated seated position by a compression spring 90 acting between a closure member 91 and a seat 92 bearing against the end of valve member 85. An axial bleed passage 93 is formed in valve member 85 between cylinder 89 and seat 92 and communicates through a line 94 with drain line 17.

Valve member 85 may be moved to the right to question memory unit 11 by the application of force on an extension 95 of the valve member. This force may be applied manually or by hydraulic, pneumatic or other means, although in this instance extension 95 is shown provided with a knob 96 for manual questioning.

Answer pressure line 87 may be connected to pressure responsive means such as indicating means 100, which, in this instance, is a Bourdon pressure gauge which requires work to move the pointer 101 thereof. When knob 96 is pressed to question the memory unit 11, the pressure $P_v$ in chamber 21, which may now be referred to as answer pressure, is transmitted through line 33, questioner 13, and line 87 to the indicating means 100 where work is done to move pointer 101 to an indicating position.

Because fluid is constantly flowing through fixed orifice 32 and variable orifice 24a, the fluid leaving chamber 21 to perform work at gauge 100 is continuously replaced and, when the work of moving pointer 101 is completed, the pressure in chamber 21 will be the same as it was before questioner 13 was operated. Accordingly, the answer pressure derived by questioning memory unit 11 may be utilized to perform work, such as operating indicators, hydraulic motors, and the like without disturbing the memory condition of the memory unit 11. In addition, movement of the shaft of needle 27, when the memory unit is being conditioned to store pressure information, may be used to operate indicating means, pilot valves, or the like. It will also be appreciated that if the questioner 13 be held open or eliminated, the apparatus may be used to provide a continuous measurement of changes in the reference pressure $P_r$.

While the regulator 14 may be of any type well known in the art to which the invention pertains, it is herein shown as comprising a cylindrical body 110 connected at opposite ends to the regulated pressure supply line 16 and drain line 17, and containing a reciprocable piston 111. Piston 111 is provided with an annular groove 111a which places supply line 15 into communication with regulated pressure line 16, with a portion of piston 111 serving to control passage of pressure fluid into line 16. Piston 111 divides cylinder 110 into chambers 112 and 113, and is urged to the right as viewed in the drawings by a load spring 114. Movement of piston 111 to the right as a result of pressure increases in line 17 and chamber 113 tends to increase pressure in regulated line 16 and will be opposed by a corresponding increase in pressure in chamber 112 through a branch line 16a. Accordingly, it will be apparent that piston 111 will be positioned so as to maintain constant the pressure differential $\Delta P$ between lines 16 and 17 as determined by load spring 114.

Figure 2:
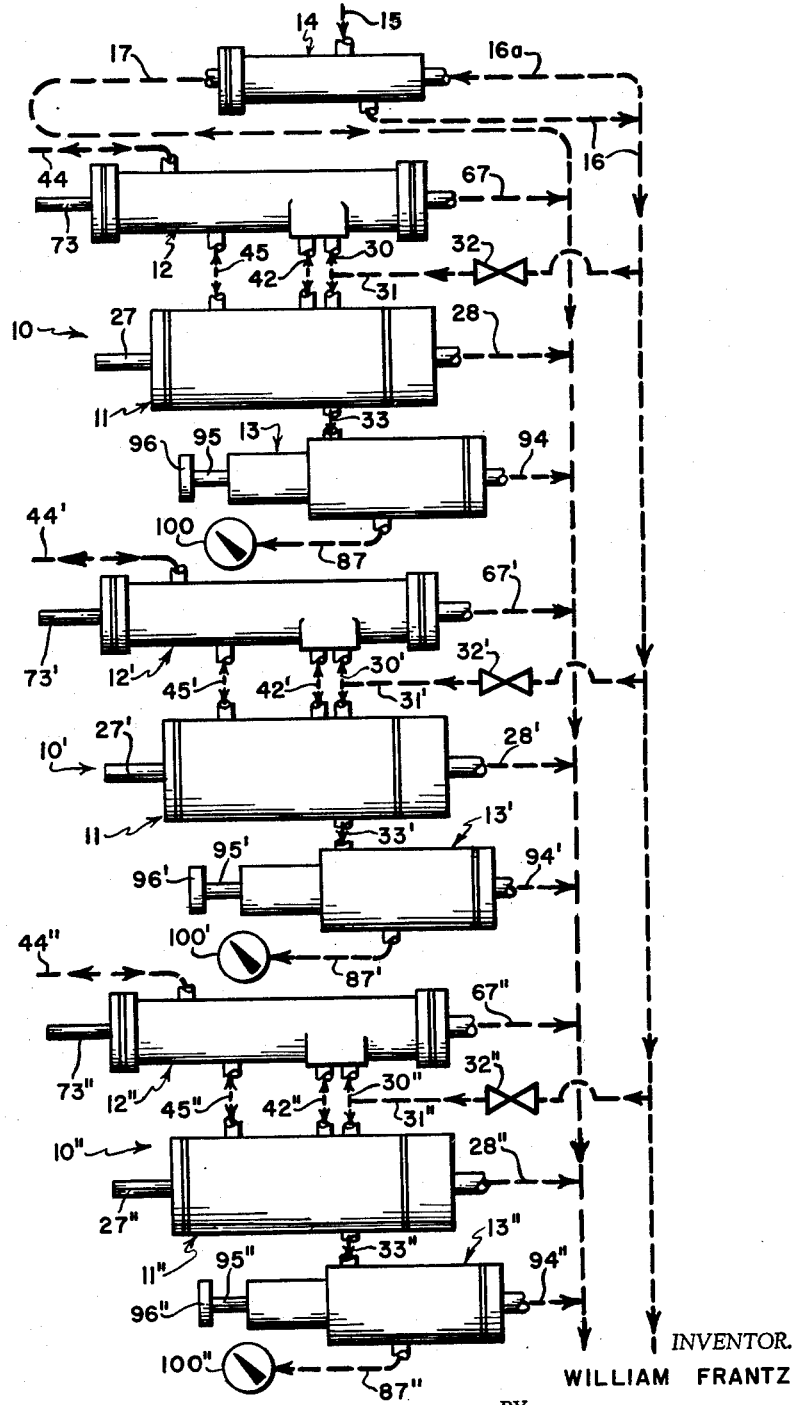
FIG. 2 is a schematic illustration showing the arrangement of a bank of memory apparatuses.

Referring now to FIG. 2, in which parts corresponding to the apparatus of FIG. 1 have corresponding reference numerals, there is provided a bank of three memory units 10, 10', and 10''. A single pressure differential regulator 14 serves all three memory units as shown. By utilizing a plurality of memory units 10 as shown in FIG. 2, a plurality of reference pressures may be stored for later questioning in any desired sequence, thereby making the apparatus admirably suited to the controlling of a program of events in response to a desired sequence of questions. Alternatively, a bank of units 10, 10', 10'' may be used to remotely monitor a plurality of pressure conditions, for example such as may exist at different points along a pressurized fuel system. In this connection it should be noted that the fluid pressure $P_r$, being monitored or remembered, never goes beyond chamber 22, and that the fluid passing through chamber 21 and to indicator 100 is in an entirely separate system. Therefore, should the reference pressure fluid be of corrosive or dangerous nature, it can be confined to its existing locale while the pressure thereof is indicated at safe distances and without danger of corrosion in the indicating instruments.

Figure 3:
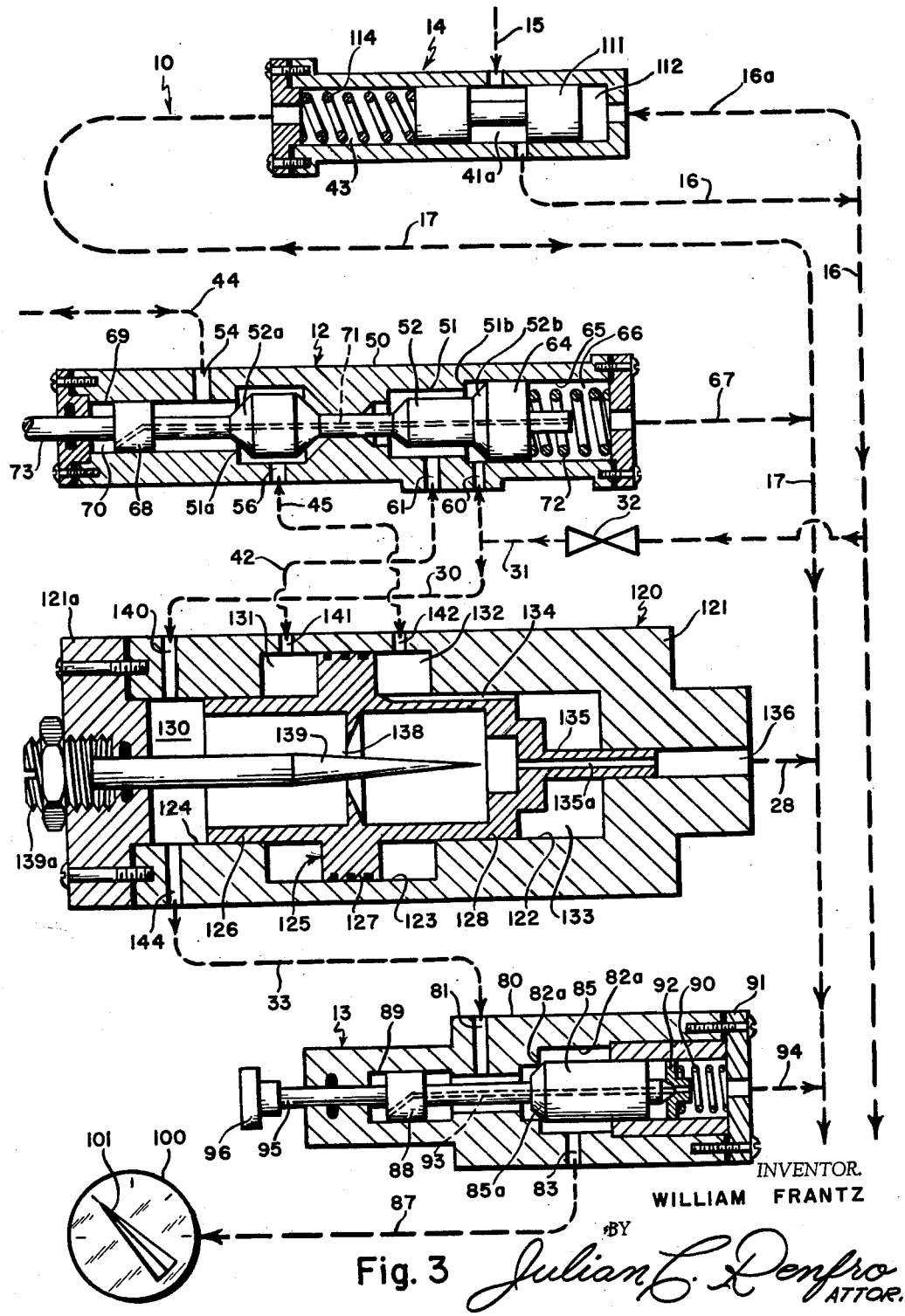
FIG. 3 is a schematic illustration of a modified memory apparatus.

In the form of the apparatus shown in FIG. 3, in which parts corresponding to those of FIG. 1 have corresponding reference numbers, a modified memory unit 120 has been substituted for memory unit 11. In this form of memory unit there is provided a body member 121 having a stepped bore including cylinder portions 122, 123 and 124.

A floating piston 125 is disposed in the stepped bore and has one end portion 126 operable in cylinder 124, a medial portion 127 operable in cylinder 123, and an end portion 128 operable in cylinder 122. Piston 125 thereby defines in the bore a plurality of chambers 130, 131, 132, and 133. Piston 125 is further provided with a groove 134 between chambers 132, 133, and a sleeve-like extension 135 extending through chamber 133 and reciprocably received in a bore 136. Communication between chamber 130 and bore 136 is provided through an orifice 138 defined in hollow piston 125 and a passage 135a in sleeve 135. A tapered needle 139 is adjustably mounted by a threaded portion 139a thereof on a closure member 121a and extends through variable orifice 138 so as to govern the size thereof in accordance with the position of piston 124 in body 121.

Piston 125 is adapted to be positioned to change the size of variable orifice 138 in accordance with hydraulic fluid pressures in chambers 130, 131, 132, and 133. To this end, chamber 130 is provided with an inlet passage 140 connected to regulated pressure line 16 through connecting lines 30, 31, and fixed orifice 32. Chamber 131 is served by a passage 141 connected to mode selector 12 by line 42, while chambers 132 and 133 are served by a passage 142 connected to mode selector 12 by line 45. Passage 135a and bore 136 are connected by line 28 to the drain line 17, and chamber 130 is provided with a passage 144 connected by line 33 with questioner 13, as shown.

In this embodiment, with the spool 52 of mode selector 12 positioned as shown and with a reference pressure $P_r$ present at reference pressure line 44, the reference pressure will be transmitted via line 45 and passage 142 to chambers 132, passage 134 and chamber 133. The reference pressure $P_r$ will tend to move piston 125 to the left, as viewed in the drawings, thereby tending to reduce the area of variable orifice 138 around tapered needle 139. At the same time, fluid pressure from regulated supply line 16 will pass through fixed orifice 32, and lines 30, 31 into chamber 130, and through line 30, mode selector 12, line 42, and passage 141, into chamber 131. The pressure $P_v$, which will thereby be developed in chambers 130 and 131, is dependent upon the size of variable orifice 138 through which the pressure fluid flows to drain line 17 via passage 135a, bore 136, and line 28.

It will be recognized that pressure $P_v$ in chambers 130 and 131 will tend to move piston 125 to the right and to increase variable orifice 138. Piston 125 will therefore be positioned by the opposing pressures $P_r$ and $P_v$ so as to vary orifice 138 and $P_v$ until the piston has equal forces exerted on opposite sides thereof. It will also be recognized that by having extension 135 substantially the same diameter as the cross-section of needle 139 and orifice 138, the effective areas against which pressures $P_r$ and $P_v$ may act will be substantially the same, and hence $P_v$ will substantially equal $P_r$ when the piston is in a balanced position.

If mode selector 12 is now actuated to a closed condition, piston 125 will be hydraulically locked against movement to cause further changes in variable orifice 138, regardless of subsequent pressure changes in reference pressure line 44. Thus, memory unit 120 is conditioned to maintain $P_v$ constant in chamber 130, and to restore this pressure even though pressure fluid is utilized therefrom to perform work such as the operation of gauge 100 upon opening of questioner 13.

Although the memory units 11 and 120 have been provided with pressure responsive bellows 36 and piston 125, respectively, which present substantially equal effective areas to pressures $P_r$ and $P_v$ so that when balanced the pressures will be equal, it will be understood that for pressure responsive means having unequal effective areas, a pressure $P_v$ will be developed which corresponds to but does not equal the reference pressure applied. Also, while the variable orifices have been shown as governed by tapered needles, it will be apparent that other forms of variable restricting means may be used, such as rotary valve means, or a plate valve having means for progressively exposing openings therethrough.

While the present invention has been described in considerable detail and with reference to several specific memory units embodying the invention, it will be understood that the invention is not limited thereto, but rather the invention includes all those modifications, adaptations, and uses as are reasonably embraced by the scope of the claims hereof.

Having thus described my invention, I claim:
1. Hydromechanical apparatus of the character described comprising:
 (a) fluid conducting means including first and second orifices connected in series with a chamber therebetween so that fluid flowing at a regulated pressure through said orifices establishes a pressure in said chamber related to the ratio of orifice areas;
 (b) pressure responsive means positionable by fluid pressure action on opposite sides thereof to change the size of one of said orifices;
 (c) fluid conducting means for applying a reference pressure to one side of said pressure responsive means;
 (d) fluid conducting means providing communication between said chamber and the other side of said pressure responsive means;
 (e) whereby said pressure responsive means is posi- tioned to regulate said one orifice so that pressure in said chamber corresponds to said reference pressure, and (f) means for selectively controlling said communication between said chamber and the other side of said pressure responsive means so that by selectively cutting off said communication, the pressure in said chamber at any moment, corresponding to said reference pressure, may be maintained.

2. Hydromechanical apparatus of the character described comprising:
 (a) fluid conducting means including first and second orifice means connected in series with a first chamber therebetween so that fluid flowing through said orifice at a regulated pressure establishes a pressure in said first chamber related to the ratio of orifice areas;
 (b) pressure responsive means for changing the effective area of one of said orifices to provide changes in pressure in said first chamber;
 (c) means defining a second chamber adjacent said first chamber and having a reference pressure inlet,
 (d) said pressure responsive means being positionable by combined effects of pressures in said first and second chambers to change said one orifice until the effect of pressure in the first chamber on said pressure responsive means balances the effect of said reference pressure thereon, and
 (e) means for selectively controlling communication between said first and second chambers so as to provide control over changes of area of said orifice, whereby by closing off said communication, a pressure related to such reference pressure may be stored in said first chamber, to remain unchanged despite subsequent fluctuations in said reference pressure.

3. An hydromechanical memory system for deriving, from a flow of fluid between a regulated source and drain having a constant differential therebetween, an answer pressure corresponding to a reference pressure to be remembered, said system comprising:
 (a) a memory unit comprising a variable orifice connected in series with a fixed orifice between said source and drain so as to establish an answer pressure zone between said orifices;
 (b) said memory unit including pressure responsive means positionable by fluid pressure action on opposite sides thereof;
 (c) means for applying said reference pressure to one side of said pressure responsive means so that said reference pressure urges said pressure responsive means in a direction tending to restrict said variable orifice and increase pressure in said answer pressure zone; and
 (d) valve means connected between said answer pressure zone and the other side of said pressure responsive means and operable to permit pressure from said zone to urge said pressure responsive means in a direction tending to increase said variable orifice and to decrease pressure in said zone;
 (e) whereby said pressure responsive means seeks a balanced position wherein said answer pressure in said zone corresponds to said reference pressure,
 (f) said valve means being operable to hydraulically lock said pressure responsive means against movement.

4. An hydraulic memory system as defined in claim 3 and wherein said pressure responsive means comprises a piston reciprocable in cylinder means by said reference and answer pressures, said variable orifice comprising orifice defining means movable with said piston, and tapered needle valve means fixed with respect to said cylinder means and extending through said orifice defining means.

5. An hydraulic memory system as defined in claim 3 and wherein said pressure responsive means comprises an expansible element mounted in a chamber defined in a body and having a wall movable with respect to said body by said reference and answer pressures, said variable orifice comprising orifice defining means mounted in said body, and tapered needle valve means movable by said wall and extending through said orifice defining means.

6. An hydromechanical memory system for deriving, from a flow of fluid between a regulated source and drain having a constant differential therebetween, an answer pressure corresponding to a reference pressure to be remembered, said system comprising:
 (a) a memory unit comprising fluid conducting means including a variable orifice connected in series with a fixed orifice between said source and drain so as to establish an answer pressure in a first chamber between said orifices;
 (b) means defining a second chamber having a reference pressure inlet;
 (c) said memory unit including pressure responsive means positionable by reference and answer pressures acting on opposite sides thereof to change said variable orifice;
 (d) a mode selector comprising first and second valve means;
 (e) said first valve means being connected between said second chamber and one side of said pressure responsive means and operable to permit said reference pressure to urge said pressure responsive means in a direction tending to restrict said variable orifice and increase pressure in said first chamber;
 (f) said second valve means being connected between said first chamber and the other side of said pressure responsive means and operable to permit pressure from said first chamber to urge said pressure responsive means in a direction tending to increase said variable orifice and to decrease pressure in said first chamber;
 (g) whereby said pressure responsive means seeks a balanced position wherein said answer pressure in said first chamber corresponds to said reference pressure in said second chamber, and
 (h) said first and second valve means being operable to hydraulically lock said pressure responsive means against movement.

7. An hydraulic memory system as defined in claim 6 and wherein said pressure responsive means comprises a piston reciprocable in cylinder means by said reference and answer pressures, said variable orifice comprising orifice defining means movable with said piston, and tapered needle valve means fixed with respect to said cylinder means and extending through said orifice defining means.

8. An hydraulic memory system as defined in claim 6 and wherein said pressure responsive means comprises an expansible element mounted in said second chamber defined in a body and having a wall movable with respect to said body by said reference and answer pressures, said variable orifice comprising orifice defining means mounted in said body, and tapered needle valve means movable by said wall and extending through said orifice defining means.

9. An hydromechanical memory system for deriving, from a flow of fluid between a regulated source and drain having a constant differential therebetween, an answer pressure corresponding to a reference pressure to be remembered, said system comprising:
 (a) a memory unit comprising fluid conducting means including a variable orifice connected in series with a fixed orifice between said source and drain so as to establish an answer pressure in a first chamber between said orifices;
 (b) means defining a second chamber adjacent said first chamber and having a reference pressure inlet;
 (c) said memory unit including pressure responsive means positionable by reference and answer pressures acting on opposite sides thereof to change said variable orifice; and (d) a mode selector comprising first and second valve means;

(e) said first valve means being connected between said second chamber and one side of said pressure responsive means and operable to permit said reference pressure to urge said pressure responsive means in a direction tending to restrict said variable orifice and increase pressure in said first chamber;

(f) said second valve means being connected between said first chamber and the other side of said pressure responsive means and operable to permit pressure from said first chamber to urge said pressure responsive means in a direction tending to increase said variable orifice and to decrease pressure in said first chamber;

(g) whereby said pressure responsive means seeks a balanced position wherein said answer pressure in said first chamber corresponds to said reference pressure in said second chamber;

(h) said first and second valve means being operable to hydraulically lock said pressure responsive means against movement; and (i) questioning means comprising a third valve means connected between said first chamber and an answer pressure fluid outlet.

10. A hydromechanical system for providing a remote indication of pressure of a reference fluid, comprising a hydraulic unit having a variable orifice therein, a source of hydraulic fluid for supplying a continuous flow of hydraulic fluid through said variable orifice of said unit, pressure responsive means in said unit having a member for controlling the area of said variable orifice, a reference orifice in series with said variable orifice for establishing in said unit an answer pressure zone, the pressure in said answer pressure zone being effective against a portion of said pressure responsive means so as to tend to cause the movement of said memebr to alter the area of said variable orifice, means for supplying a reference pressure to said unit, acting to oppose the effect of the pressure in the answer pressure zone against said pressure responsive means, whereby said pressure responsive means seeks a balanced position in which it causes the area of said variable orifice to be such that the answer pressure in said zone corresponds to the reference pressure, and differential pressure regulator means for assuring a constant pressure difference across said variable and reference orifices in series whereby system sensitivity will be maintained, within limits of the device, despite fluctuations in said supply pressure and in work demands upon the device.

11. The hydromechanical system as defined in claim 10 in which means are provided for selectively controlling communication between said answer pressure zone and said pressure responsive means, thereby providing control over orifice-varying movements of said member, whereby by closing off said communication, a pressure related to said reference pressure may be stored in said answer pressure zone, to remain unchanged despite subsequent fluctuations in said reference pressure.

12. The hydromechanical system as defined in claim 10 in which indicator means are provided for indicating at any selected moment the pressure in said answer pressure zone.

References Cited in the file of this patent

UNITED STATES PATENTS

| | | |
|---|---|---|
| 2,825,354 | Du Bois | Mar. 4, 1958 |
| 2,884,905 | Jenson | May 5, 1959 |
| 2,965,118 | Lindbom | Dec. 20, 1960 |

FOREIGN PATENTS

| | | |
|---|---|---|
| 1,095,407 | France | Dec. 22, 1954 |